United States Patent [19]

Jannesson

[11] 4,132,445
[45] Jan. 2, 1979

[54] APPARATUS FOR SECURING A CHARGE CARRIER AGAINST LONGITUDINAL DISPLACEMENT WITH RESPECT TO A VEHICLE FRAME

[76] Inventor: Erik H. Jannesson, Skräddaregränd 1, S-445 00 Surte, Sweden

[21] Appl. No.: 846,151

[22] Filed: Oct. 27, 1977

[51] Int. Cl.² ............................................. B62D 27/06
[52] U.S. Cl. ............................. 296/35 A; 105/366 A
[58] Field of Search ................ 296/35 A, 35 R, 28 M; 105/366 R, 366 B, 366 C, 366 D; 280/179 R, DIG. 8

[56] References Cited

U.S. PATENT DOCUMENTS

| | | | |
|---|---|---|---|
| 3,614,153 | 10/1971 | Tantlinger | 296/35 A |
| 3,719,385 | 3/1973 | Carr | 296/35 A |

Primary Examiner—Philip Goodman

[57] ABSTRACT

In a vehicle having a charge carrier which can be longitudinally shifted towards and away from a predetermined transport position on the vehicle, the vehicle frame is fitted with first stop means obstructing displacement of the charge carrier past the transport position, and with second stop means comprising a stop lever angularly displaceable by means of a link mechanism between an inoperative position and an operative position in which the stop lever obstructs displacement of the charge carrier away from the transport position in the direction not blocked by the first stop means. In the operative position of the stop lever, the link mechanism presents a dead point arrangement towards the forces exerted by the charge upon the stop lever.

5 Claims, 7 Drawing Figures

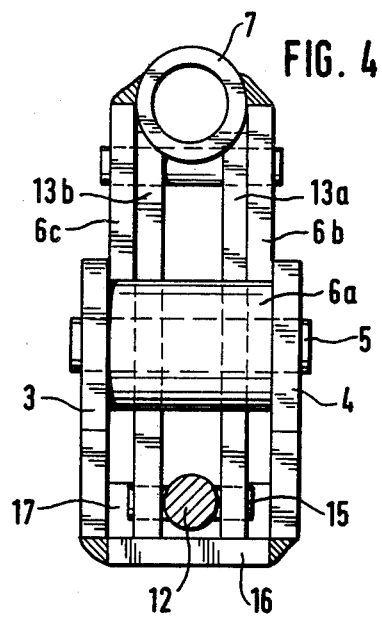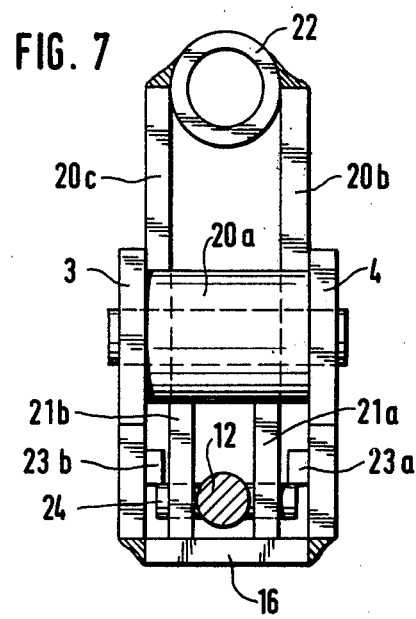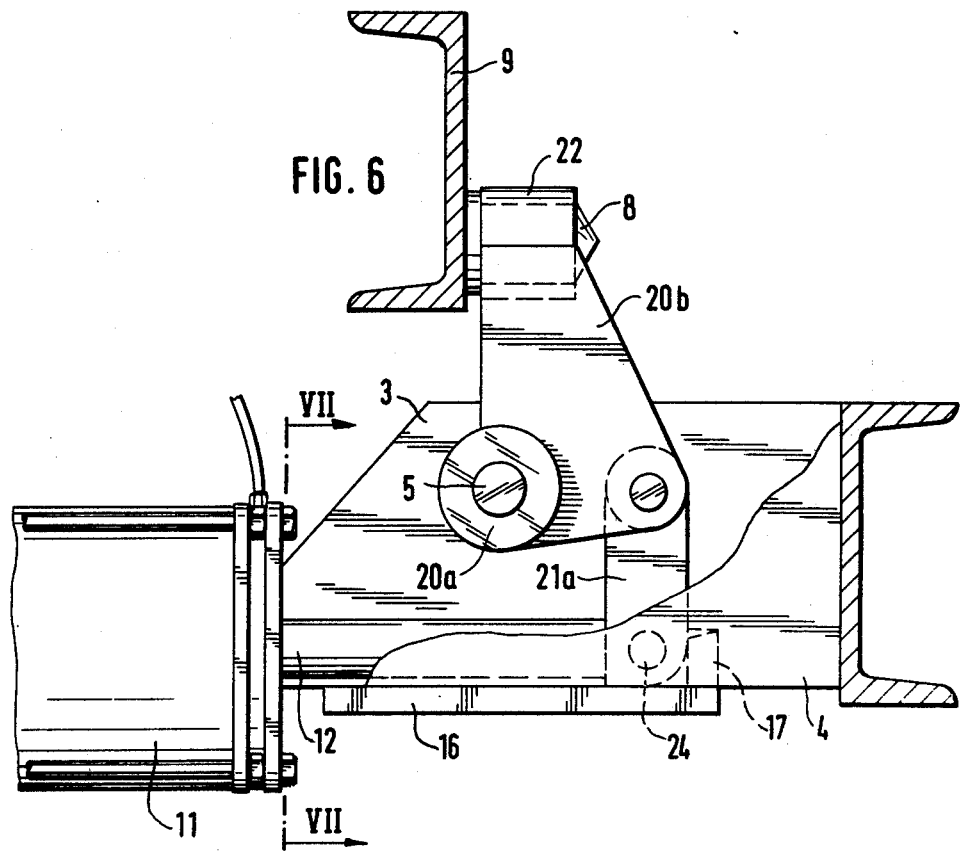

APPARATUS FOR SECURING A CHARGE CARRIER AGAINST LONGITUDINAL DISPLACEMENT WITH RESPECT TO A VEHICLE FRAME

BACKGROUND OF THE INVENTION

This invention relates to vehicles, for instance trucks and trailers, arranged to carry a detachable charge carrier. More particularly, the invention relates to apparatus for securing the charge carrier in a predetermined transport position in the vehicle.

Nowadays many vehicles, particularly trailers, are equipped with a detachable charge carrier, for instance a platform or a container, which can be loaded while detached and, when loaded, is pushed on to the vehicle by a longitudinal displacement. The vehicle frame is provided with stop means arranged to limit this displacement and to define the transport position of the charge carrier. To retain the charge carrier in said position keys or pins have been employed. Said elements have, however, proved liable to get lost in various ways. Moreover, they are frequently difficult to apply in position, for instance when the holes which are to receive them are fouled by ice or frozen dirt.

The invention has for its principal object to provide retaining means for the purpose indicated which are not liable to get lost or mislaid and which are easy to operate and provide an entirely reliable retaining action.

SUMMARY OF THE INVENTION

In accordance with the invention there is provided, in a vehicle having a frame and a charge carrier supported by and longitudinally displaceable with respect to said frame towards and away from a predetermined terminal position on said frame, means for retaining said charge carrier in said predetermined terminal position comprising first stop means on said frame for obstructing displacement of said charge carrier past said terminal position, and second stop means comprising a stop lever angularly displaceable about a fulcrum stationary in said frame between a withdrawn angular position allowing displacement of the charge carrier towards said terminal position, and an operative angular position in which said stop lever obstructs displacement of the charge carrier away from said terminal position in the direction not blocked by said first stop means, and a mechanism for operating said stop lever comprising a reciprocable motor member, a link connected to said lever by a first joint and to said motor member by a second joint, said link being arranged in the operative position of said stop lever to extend at substantially right angles to the direction of the displacement of said motor member, and means for taking up the thrust exerted by said link upon said second joint at right angles to said direction, said means comprising a support member connected to said frame and having a guide face for slidable engagement with said joint.

BRIEF DESCRIPTION OF THE DRAWINGS

FIG. 4 is a sectional view taken on the line IV—IV of FIG. 2.

FIGS. 6 and 7 are views similar to FIGS. 2 and 4, respectively, representing a modified embodiment of the invention.

DESCRIPTION OF THE EMBODIMENTS SHOWN IN THE DRAWINGS

Figure 1:
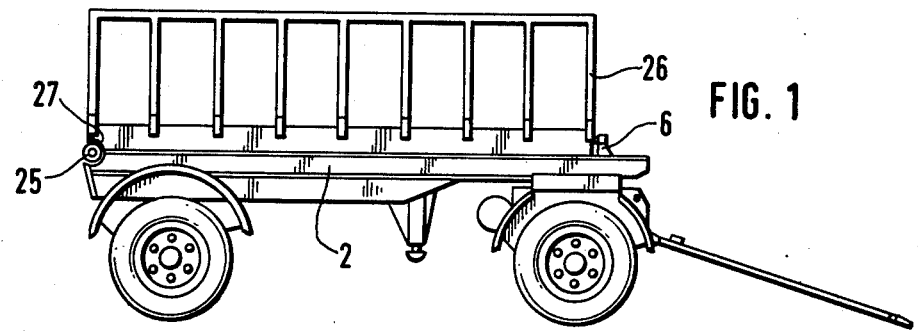
FIG. 1 is a side view of a trailer.

The trailer represented in FIG. 1 has a chassis frame 2 provided at its rear end with a pair of substantially cylindrical, laterally projecting stop members 25. A charge carrier 26 has been pushed on to the chassis frame 2 from the front end of the vehicle until the charge carrier has reached the terminal position shown determined by the engagement of a pair of semicircular hooks 27 attached to the frame of the charge carrier with the cylindrical stop members 25. To retain firmly the charge carrier 26 in the terminal position shown, a stop lever 6 maintained in a withdrawn position during the moving into position of the charge carrier is displaced angularly counterclockwise into the position shown in which the stop lever blocks forward displacement of the charge carrier which is thus held in position between the stop members 25 and the stop lever 6.

FIGS. 2 to 5 show the stop lever and its operating mechanism in more detail. 1 is a transversal member of the chassis frame 2 of the trailer. A pair of sheet metal members 3 welded to the rear face of the frame member 1 are each provided with a hole for an axle 5 serving as a fulcrum to the lever 6a, 6b, 6c. Said lever consists of a hub 6a and a pair of parallel shanks 6b, 6c supporting a sleeve member 7. In the operative position represented in FIG. 2, said sleeve member surrounds a stud 8 attached to the front side of a member 9 forming part of the frame of the charge carrier 26. In this position, the rear edge of the sleeve member 7 engages a shoulder 10 at the base of the stud 8.

Figure 3:
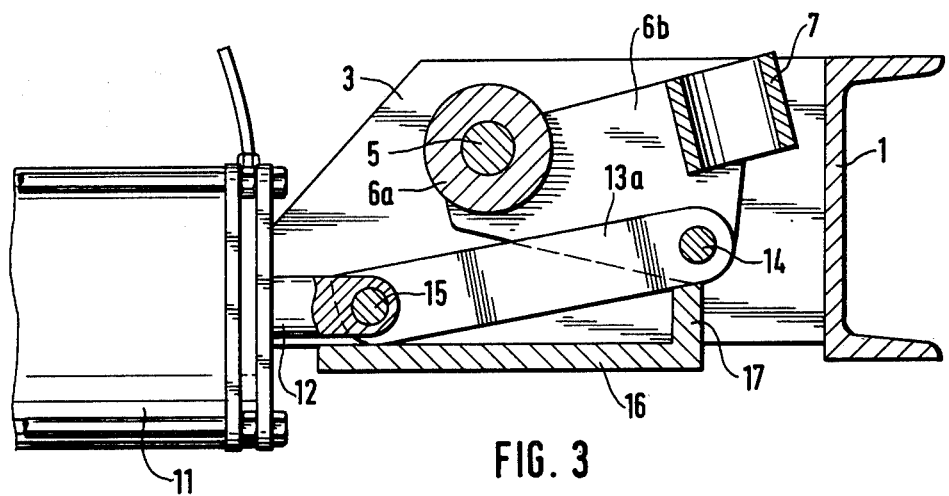
FIG. 3 is a view similar to FIG. 2 showing the stop lever in its withdrawn or inoperative position.
Figure 5:
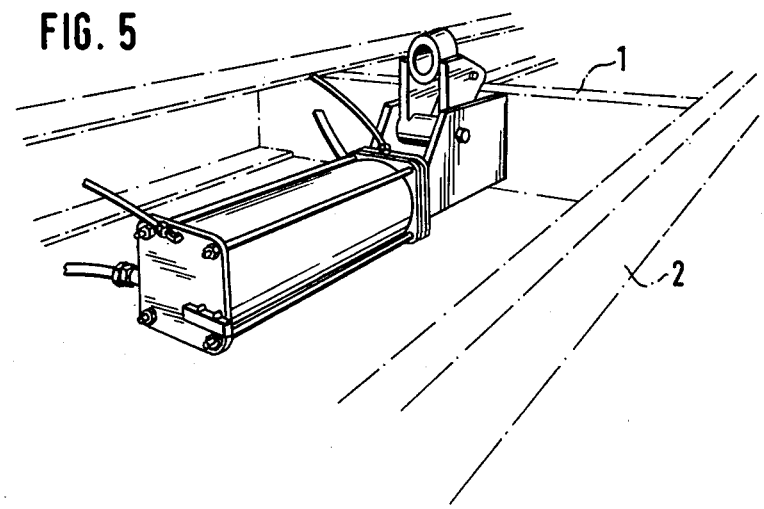
FIG. 5 is a perspective view of the stop lever of FIGS. 2 to 4 and the mechanism for operating the same.

In the withdrawn, or inoperative, position of the stop lever shown in FIG. 3, the charge carrier is free to move forward away from the stop members 25.

The stop lever 6a-c is operated by means of an operating mechanism including a fluid pressure operated cylinder 11 the piston rod 12 of which is connected to the lever 6a-c by means of a link composed of two parallel bars, said link being at one end connected to the shanks 6b,c of the lever by means of a joint pin 14, at the other end connected to the piston rod 12 by means of a joint pin 15. The lower extremity of the link slides during the displacement of the piston rod 12 on a supporting plate 16 attached by welding to the lower edges of the sheet metal members 3, 4. The supporting plate 16 is parallel to the piston rod and is provided at its forward extremity with a stop member 17 for the lower extremity of the link 13a, 13b. The length of the link 13a, 13b and the location of the joint pin 14 on the lever 6a -c are chosen so as to make the link form right angles with the supporting plate 16 (and the piston rod 12) in the operative position of the stop lever represented in FIG. 2. Consequently, the force which may be transmitted from the charge carrier to the lever 6a-c through the frame member 9, the shoulder 10 and the sleeve member 7, for instance caused by a retardation of the vehicle, and the corresponding mechanical moment produces no force tending to urge the piston rod 12 backwards, but is taken up by a reaction exerted by the support plate 16 on the lower end of the link 13a,b.

Figure 2:
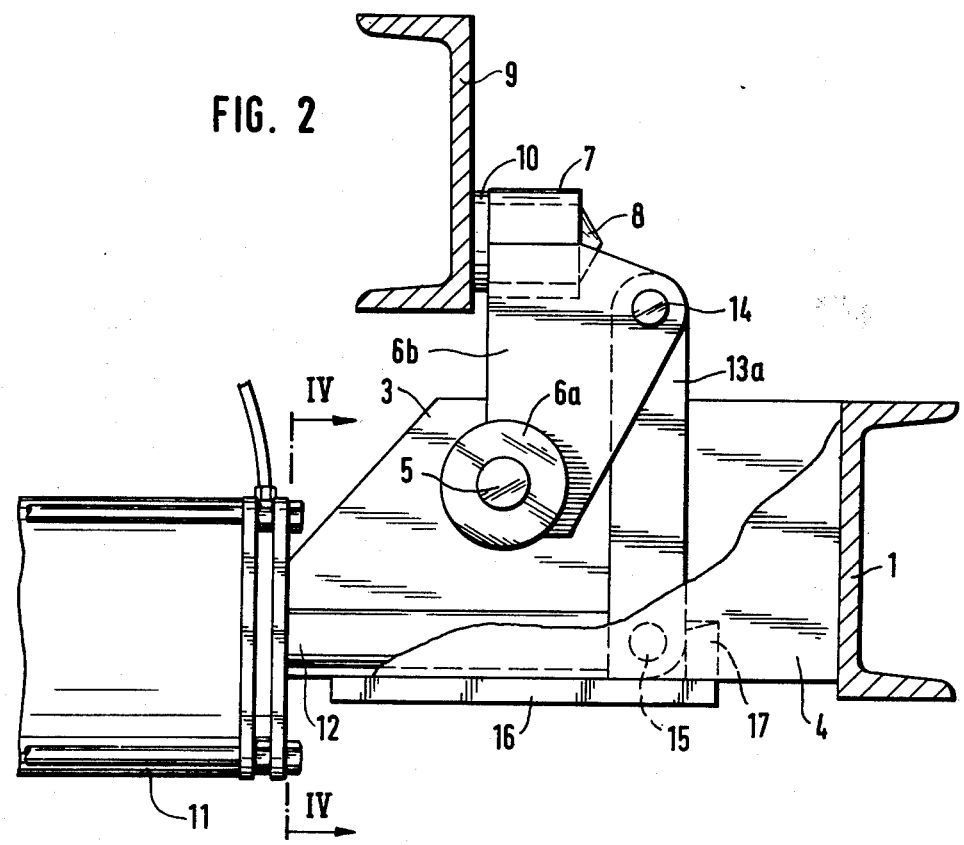
FIG. 2 is a side view, on a greater scale than FIG. 1, of parts of the frames of the trailer of FIG. 1 and the charge carrier supported thereby, partially in section, together with a stop lever and a mechanism for operating the same.

In FIG. 2, the stop member 17 is represented to be arranged in such a way that the link 13a,b in the operative position forms exactly right angles with the supporting plate 16. It is also possible, however, to arrange the stop member 17 somewhat beyond this dead point position, resulting in an even safer blocking of the link and the stop lever in their operative positions In the modified form shown in FIGS. 6 and 7, the shape of the shanks 20b, 20c of the lever 20a–c is slightly different from the one shown in FIG. 2. The link 21a,b is shorter than the link 13a,b, and the joint between the link 21a,b and the lever shanks 20b,c is placed so as to make its lever arm form about right angles with the lever arm of the sleeve 22. A pair of guide bars 23a, 23b parallel to the supporting plate 16 are attached to the inner faces of the sheet metal members 3, 4. The lower edges of said guide bars 23a, 23b serve to guide the extended ends of the joint pin 24 connecting the lower end of the link 21a,b with the piston rod 12. This arrangement ensures that the pull on the link 21a,b which may be required to disengage the sleeve 22 from the stud 8 when the stop lever is to be shifted into its withdrawn position cannot produce a bending moment on the piston rod 12 but is taken up by a reaction from the guide bars 23a,b.

In the embodiments shown the stop lever is provided with an annular member 7 or 22 while the charge carrier frame is provided with a corresponding stud 8. Alternatively, the annular member may be attached to the frame of the charge carrier while the stud is attached to the stop lever.

I claim:

1. In a vehicle having a frame and a charge carrier supported by and longitudinally displaceable with respect to said frame towards and away from a predetermined terminal position on said frame, means for retaining said charge carrier in said predetermined terminal position comprising first stop means on said frame for obstructing displacement of said charge carrier past said terminal position, and second stop means comprising a stop lever angularly displaceable about a fulcrum stationary in said frame between a withdrawn angular position allowing displacement of the charge carrier towards said terminal position, and an operative angular position in which said stop lever obstructs displacement of the charge carrier away from said terminal position in the direction not blocked by said first stop means, and a mechanism for operating said stop lever comprising a reciprocable motor member, a link connected to said lever by a first joint and to said motor member by a second joint, said link being arranged in the operative position of said stop lever to extend at substantially right angles to the direction of the displacement of said motor member, and means for taking up the thrust exerted by said link upon said second joint at right angles to said direction, said means comprising a support member rigidly connected to said frame and having a guide face for slidable engagement with said joint.

2. Apparatus as claimed in claim 1 in which said stop lever is arranged in its operative position also to obstruct displacement of said charge carrier upwards from said frame.

3. Apparatus as claimed in claim 1 in which the charge carrier is provided with a retaining stud and the stop lever is provided with an annular member arranged in the operative position of the stop lever to surround said retaining stud.

4. Apparatus as claimed in claim 1 in which the charge carrier is provided with an annular retaining member and the stop lever is provided with a stud arranged in the operative position of the stop lever to project into said annular retaining member.

5. Apparatus as claimed in claim 1 comprising a stop member provided at one end of said support member so as to obstruct displacement of said second joint substantially past the position in which the link forms right angles with said direction.

* * * * *